(12) United States Patent
Benzie et al.

(10) Patent No.: US 10,415,336 B2
(45) Date of Patent: *Sep. 17, 2019

(54) EXPANDABLE ANCHOR SLEEVE

(71) Applicant: Mohawk Energy Ltd., Houston, TX (US)

(72) Inventors: Scott A. Benzie, Houston, TX (US); Jorge J. Bermudez, Houston, TX (US); Alessandro Caccialuppi, Houston, TX (US); Andrei G. Filippov, Houston, TX (US)

(73) Assignee: Mohawk Energy Ltd., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,785

(22) Filed: Feb. 9, 2017

(65) Prior Publication Data

US 2017/0226816 A1     Aug. 10, 2017

Related U.S. Application Data

(60) Provisional application No. 62/293,543, filed on Feb. 10, 2016.

(51) Int. Cl.
*E21B 23/01* (2006.01)
*E21B 43/26* (2006.01)
(Continued)

(52) U.S. Cl.
CPC .......... *E21B 23/01* (2013.01); *E21B 33/1293* (2013.01); *E21B 43/26* (2013.01); *F16B 13/063* (2013.01); *F16B 2013/006* (2013.01)

(58) Field of Classification Search
CPC ...... E21B 23/01; E21B 33/1293; E21B 43/26; F16B 13/063; F16B 2013/006
(Continued)

(56) References Cited

U.S. PATENT DOCUMENTS 6,959,759 B2    11/2005   Doane et al.
7,124,829 B2    10/2006   Braddick
(Continued)

FOREIGN PATENT DOCUMENTS

WO     2014100072     6/2014

OTHER PUBLICATIONS

Invitation to pay additional fees for Application No. PCT/US16/68369 dated Jun. 19, 2017.
(Continued)

*Primary Examiner* — James G Sayre
(74) *Attorney, Agent, or Firm* — Tumey L.L.P.

(57) ABSTRACT

A device and method for an expandable anchor sleeve. An expandable anchor sleeve may comprise a front-end and a back-end for a wellbore comprising a base casing. The expandable anchor sleeve may further comprise an anchoring element having a conical shape with a front-end radial thickness being larger than a back-end radial thickness, not less than a difference between corresponding radii of maximum and minimum internal diameters of the base casing and providing the anchoring element is in interference contact with the base casing upon radial expansion of the expandable anchor sleeve by an expansion swage propagating in the front-end direction. A method for installation of an expandable anchor sleeve in a well comprising a base casing which may comprise connecting an expandable anchor sleeve to an expansion, deploying the expandable anchor sleeve, activating the expansion device, and removing the expansion device from the well.

12 Claims, 3 Drawing Sheets

(51) Int. Cl.
*F16B 13/00* (2006.01)
*F16B 13/06* (2006.01)
*E21B 33/129* (2006.01)

(58) Field of Classification Search
USPC .............................................. 166/118, 217
See application file for complete search history.

(56) References Cited

U.S. PATENT DOCUMENTS

| | | | |
|---|---|---|---|
| 7,640,976 | B2 | 1/2010 | Filippov |
| 7,730,955 | B2 | 6/2010 | Farquhar |
| 7,810,570 | B2 | 10/2010 | Collins et al. |
| 7,971,640 | B2 | 7/2011 | Freyer |
| 8,020,625 | B2 | 9/2011 | Ring |
| 9,010,415 | B2 | 4/2015 | Benzie et al. |
| 9,057,260 | B2 * | 6/2015 | Kelbie .................. E21B 43/103 |
| 9,309,733 | B2 | 4/2016 | Xu |
| 2004/0256098 | A1 | 12/2004 | Ducasse |
| 2006/0016597 | A1 * | 1/2006 | Emerson .................. E21B 7/20 |
| | | | 166/277 |
| 2007/0221374 | A1 | 9/2007 | Filippov |
| 2010/0252278 | A1 | 10/2010 | Harris et al. |
| 2010/0270035 | A1 | 10/2010 | Ring |
| 2013/0133901 | A1 | 5/2013 | Benzie |
| 2014/0027118 | A1 | 1/2014 | Delange et al. |
| 2014/0054047 | A1 * | 2/2014 | Zhou ..................... E21B 43/106 |
| | | | 166/382 |
| 2015/0337619 | A1 | 11/2015 | Hern et al. |
| 2016/0032696 | A1 | 2/2016 | Caccialupi |
| 2017/0022781 | A1 * | 1/2017 | Martin ................ E21B 33/1208 |
| 2017/0241231 | A1 * | 8/2017 | Benzie ................. E21B 33/128 |

OTHER PUBLICATIONS

International Search Report and Written Opinion for International Patent Application No. PCT/US16/68369 dated Sep. 14, 2017.
International Preliminary Report on Patentability for Application No. PCT/US2017/017215 dated Aug. 23, 2018.
International Search Report and Written Opinion for Application No. PCT/US2017/017215 dated Apr. 27, 2017.
USPTO Non-Final Office Action for U.S. Appl. No. 15/388,732 dated Sep. 12, 2018.

* cited by examiner

EXPANDABLE ANCHOR SLEEVE

RELATED APPLICATIONS

This application is a non-provisional application that claims the benefit of U.S. Application No. 62/293,543 filed Feb. 10, 2016 which is incorporated by reference herein in its entirety.

BACKGROUND OF THE INVENTION

The present disclosure generally relates to oil and gas extraction. Specifically, the disclosure provides an expandable anchor sleeve system which may be used as a packer, a flow restriction barrier for fracturing operations or a bridge plug.

Downhole tools referred to as packers, frac plugs and bridge plugs are well known in the art of producing oil and gas. However, most of conventional downhole tools are set against well casing by anchoring elements such as slips which include sliding wages which may cause premature set conditions and questionable reliability. Thus, what may be needed and provided by the present disclosure may be a reliable anchoring system and a simple reliable tool setting system capable of preventing premature set conditions and improved reliability which may be achieved by utilizing metal plasticity resulting in eliminating moving parts and providing significantly larger passage through compared to conventional tools.

SUMMARY OF THE INVENTION

An expandable anchor sleeve system comprises an expandable anchor sleeve and an expansion device. The sleeve may comprise a sealing element at the back-end portion, a gripping device at the front-end portion, and an anchoring element in the middle portion. In an embodiment, the anchoring element has the difference between front-end radial thickness and back-end radial thickness to be not less than the difference between corresponding radii of maximum and minimum diameters of the base casing. The expansion device comprises a shaft and a connecting device coupled to the shaft at the front-end. The expansion device also includes an expansion swage slidably attached to the shaft, and a thruster. The thruster may be connected to the expansion swage and propels the expansion swage towards the connecting device. The connecting device adapted to be engaged with gripping device of the sleeve, providing that it may be disengaged from the gripping device at a certain release force.

Upon expansion of the sleeve, anchoring element comes in contact with base casing and the force for swage propagation increases due to interference force between anchoring element and the base casing. Due to the conical shape of the anchoring element with thickness increasing in front direction the interference force increases with swage propagation in the front direction. Thus, the total cladding force, defined as a sum of free expansion force and interference force, increases upon swage propagation in the front direction. When cladding force reaches the value of the release force the expansion device disconnects from the sleeve. Thus, providing the release force being greater than the free expansion force, the expansion device expands the sleeve bringing anchoring element in interference contact with base casing and then disconnects connecting device from the gripping element in one stroke of the thruster. The sleeve may be configured as a frac plug, a caged ball frac plug, a bridge plug or a packer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DESCRIPTION OF THE PREFERRED EMBODIMENT

Figure 1:
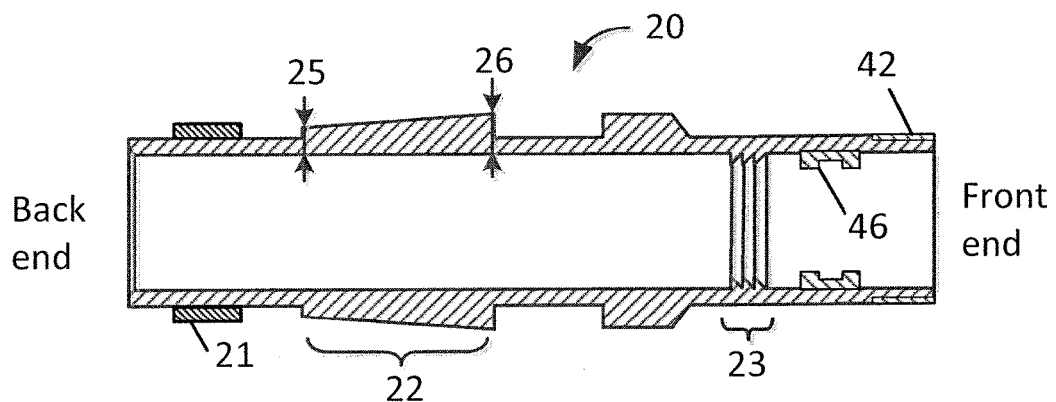
FIG. 1 illustrates a section view of an expandable sleeve.

FIG. 1 schematically shows a cross-section of the expandable anchor sleeve 20 before expansion. Expandable anchor sleeve 20 has a front-end and a back-end. Expandable anchor sleeve 20 may comprise a sealing element 21 at the back-end portion, a gripping device 23 at the front-end portion, a threaded portion 42 at the front-end portion, and an anchoring element 22 in the middle portion.

Figure 4:
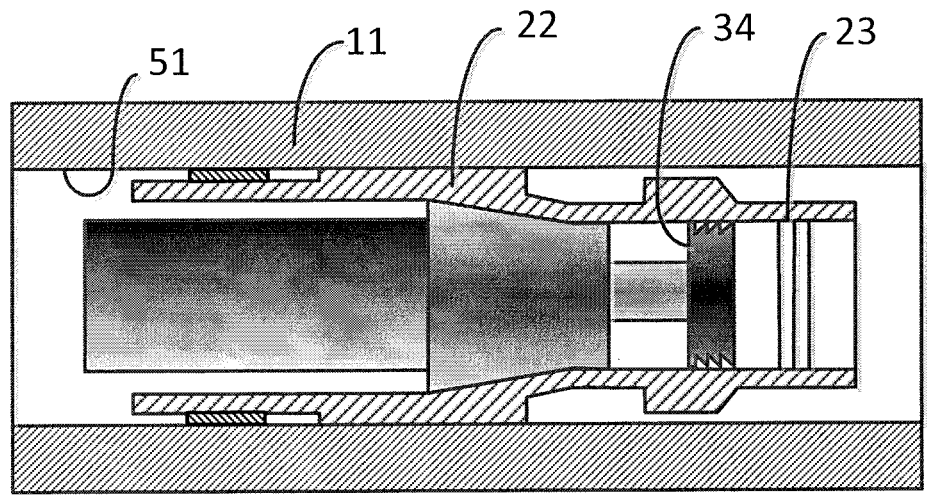
FIG. 4 illustrates a section view of the expandable sleeve in the set position with the expansion device disconnected from the sleeve.

Sealing element 21 may comprise metal wickers or elastomeric components, or combination thereof providing sealing engagement with inside surface 51 of base casing 11, see FIG. 4, upon radial expansion of the sleeve.

Figure 2:
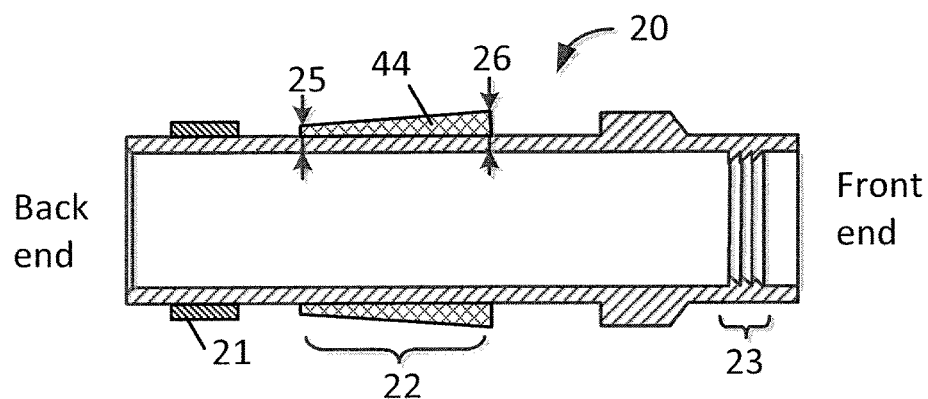
FIG. 2 illustrates a section view of a sleeve of FIG. 1 comprising an anchoring element with a C-ring from hardened material.
Figure 5:
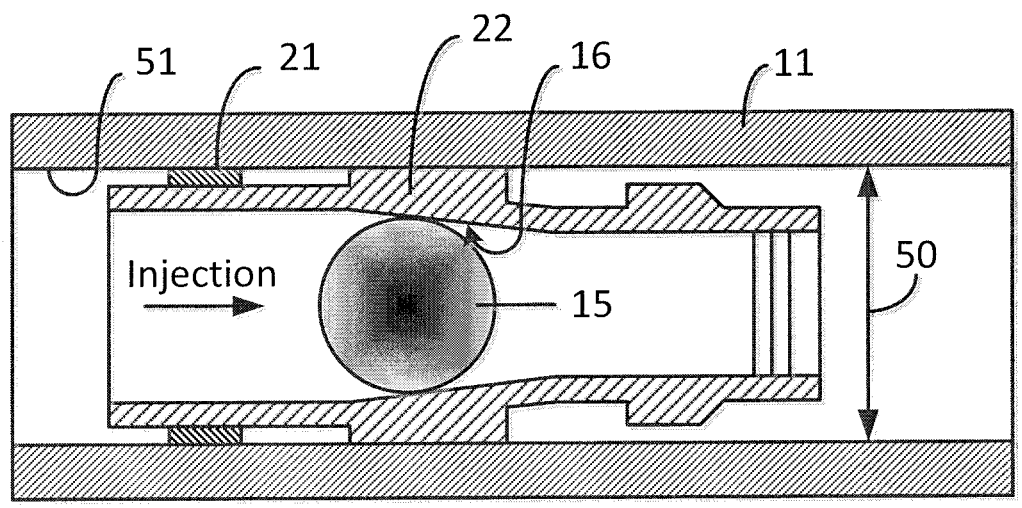
FIG. 5 illustrates a section view of the sleeve of FIG. 4 with expansion device being removed and a frac ball landed in the sleeve.

The anchoring element 22 may be adapted to come in interference contact with inside surface 51 of base casing 11, see FIG. 4, upon radial expansion of expandable anchor sleeve 20. The external surface of the anchoring element 22 may comprise wickers or hardened coating with hard particles. In embodiments, anchoring element 22 may comprise a C-ring 44 made from hardened material, see FIG. 2. In an embodiment, the anchoring element 22 may have a conical shape of the internal or external or both surfaces providing that the front-end radial thickness 26 being greater than the back-end radial thickness 25 to accommodate for variations of internal diameter 50 of base casing 11, see FIG. 5. An anchoring element 22 of a conical shape refers to a tubular having at least a portion of the tubular with gradually increasing radial thickness towards the front-end. The internal and external surfaces of the conical shape anchoring element 22 may be straight, concave, convex, and/or any combination thereof. In an embodiment, the anchoring element 22 further may have the difference between front-end radial thickness 26 and back-end radial thickness 25 to be not less than the difference between corresponding radii of maximum and minimum diameters of the base casing 11 defined for example by API, 5CT Specification for Casing and Tubing. The difference between the front-end radial thickness 26 and the back-end radial thickness 25 of the expandable anchor sleeve 20 may be different for different sizes of base casing 11. In an embodiment, the difference may be between about 1.0 and about 15.0 millimeters, alternatively between about 1.4 millimeters and about 7.0 millimeters.

Figure 3:
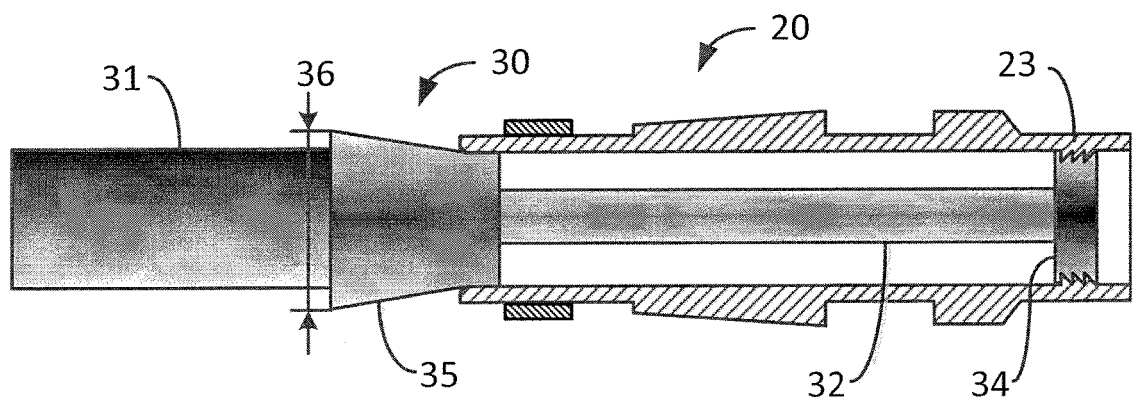
FIG. 3 illustrates a section view of the expandable sleeve of FIG. 1 attached to the expansion device.

The gripping element 23 may comprise shear pins and/or protrusions, or combination thereof providing that it may be adapted to receive a connecting device 34 of the expansion device 30, see FIG. 3.

Expansion device 30 comprises a shaft 32 with a connecting device 34 coupled to the shaft 32 at the front-end. Expansion device 30 also includes an expansion swage 35 slidably attached to the shaft 32 and a thruster 31. The thruster 31 may be connected to the expansion swage 35 and propels the expansion swage 35 towards the connecting device 34.

The connecting device 34 may be any device adapted to be engaged with gripping device 23 of expandable anchor sleeve 20, for example it may comprise shear pins or protrusions, or combination thereof providing that it may be disengaged from the gripping device 23 at a certain release force, applied in the rear-end direction. In embodiments, connecting device 34 and gripping device 23 comprise mateable threads adapted to secure expansion device to expandable anchor sleeve 20 and to permit release of connecting device 34 from the gripping device of expandable anchor sleeve 20 upon application of the release force.

The swage diameter 36 may be selected such that upon expansion the anchoring element comes in interference contact with internal surface of the base casing 11 having the maximum internal diameter. The swage diameter 36, geometry and material properties of expandable anchor sleeve 20 define a free expansion force, necessary for radial expansion of expandable anchor sleeve 20 in free conditions, i.e. without interference with base casing 11. Upon expansion of expandable anchor sleeve 20, see FIG. 4, anchoring element 22 comes in contact with base casing and the force for swage propagation increases due to interference force between anchoring element 22 and base casing 11. Due to the conical shape of the anchoring element 22 with increasing thickness in front direction the interference force increases with swage propagation in the front direction. Thus, the total cladding force, defined as a sum of free expansion force and interference force, increases upon swage propagation in the front direction. When cladding force reaches the value of the release force, expansion device 30 disconnects from expandable anchor sleeve 20. Thus, providing the release force being greater than the free expansion force, expansion device 30 expands expandable anchor sleeve 20 bringing anchoring element 22 in interference contact with base casing 11 and then disconnects connecting device 34 from the gripping element 23 in one stroke of the thruster 31.

In operation, the expandable sleeve system shown in FIG. 3 may be deployed in the well to a desired location. Then, the thruster 31 may be actuated setting expandable anchor sleeve 20 in the well casing and disconnecting from expandable anchor sleeve 20, see FIG. 4. After that the expansion device may be retrieved from the well and a frac ball 15, see FIG. 5, may be dropped to land on partially expanded portion 16 of expandable anchor sleeve 20 or on a ball seat, not shown. The frac ball 15 may be metallic or non-metallic having a spherical, elliptical, conical or a cylindrical shape providing that it may close off the passage through expandable anchor sleeve 20. Pressure may be elevated from the surface and a zone thereabove may be fractured. By repeating this operation the desired number of zones may be fractured.

Figure 6:
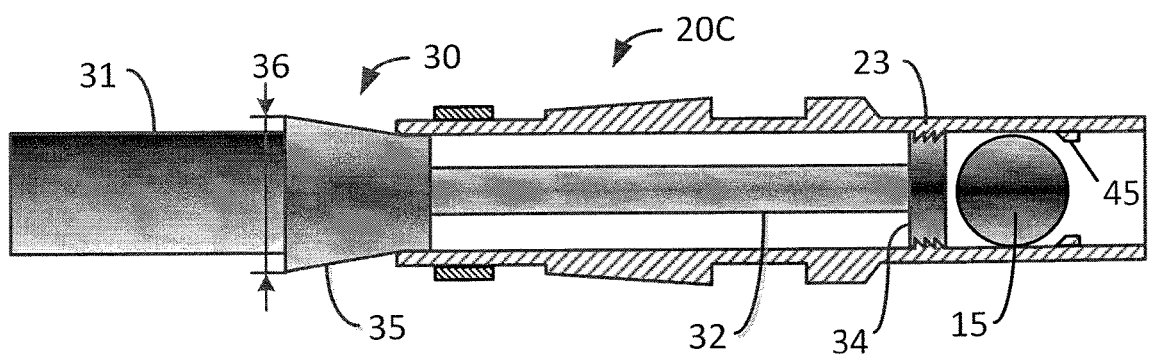
FIG. 6 illustrates a section view of the sleeve with a caged ball.

In another embodiment, it may be seen in more detail as generally illustrated in FIG. 6, wherein the frac ball 15 may be positioned (caged) in front-end of the sleeve 20C between the ball seat 45 and the connecting device 34 of the expansion device 30 before deployment in the well. The sleeve 20C may be identical in all respects to that described with respect to FIG. 1 except it has an elongated front-end with the ball seat 45 positioned in front of the gripping element 23. The ball seat 45 may be defined as a step reduction in the internal diameter of the sleeve 20C having the internal diameter less than the diameter of frac ball 15. Also, the expansion device 30 may be identical in all respects to that described with respect to FIG. 3. In operation, the expandable sleeve system shown in FIG. 6 may be deployed in the well to a desired location. Then, the thruster 31 may be actuated setting expandable anchor sleeve 20 in the well casing and disconnecting from expandable anchor sleeve 20. After expansion device 30 may be retrieved, increased fluid pressure in the well may cause the ball 15 to engage seat 45 to prevent flow downwardly through expandable anchor sleeve 20 and a zone there above may be fractured. Repeating this operation desired number of zones may be fractured.

Figure 7:
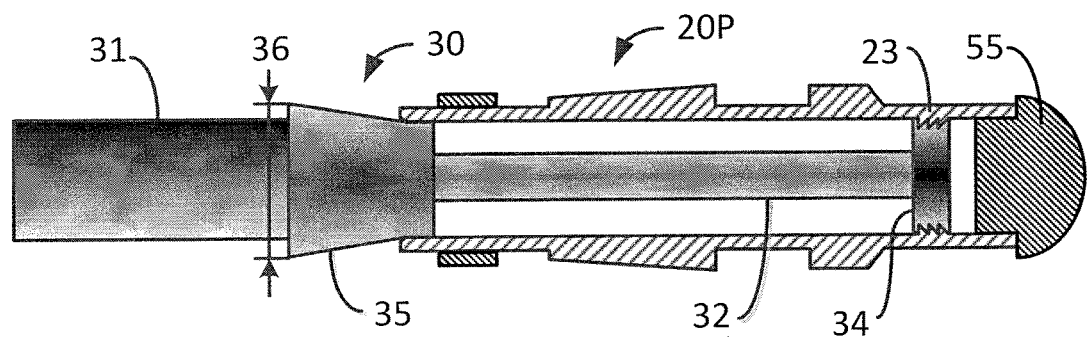
FIG. 7 illustrates a section view of the sleeve with a plug.

FIG. 7 generally illustrates another embodiment, which may be identical in all respects to that described with respect to FIG. 3 except that it comprises a plug 55 attached to the sleeve 20P in the front of the gripping element 23. The plug 55 may be metallic or non-metallic or made from material dissolvable in well fluids. Once set in the well, sleeve 20P may prevent flow downwardly and upwardly acting as a bridge plug.

In another embodiment, the expandable anchor sleeve 20 as illustrated in FIG. 3 may comprise a threaded portion 42 at the front-end to provide a threaded connection to a tubular, a nipple, a sandscreen, a velocity string or the like. Once set in the well it may provide the hanging and sealing capacity acting as a packer. Alternatively, a nipple 46 may be disposed inside expandable anchor sleeve 20, as illustrated in FIG. 1. In embodiments, nipple 46 may be a landing nipple, a no-go nipple, a selective-landing nipple, a ported or safety-valve nipple or the like.

Expandable anchor sleeve 20 may be configurable as a standard frac plug, a caged ball frac plug, a bridge plug, or a packer.

Although the present invention and its advantages have been described in detail, it should be understood that various changes, substitutions and alterations may be made herein without departing from the spirit and scope of the invention as defined by the appended claims.

What is claimed is:

1. An expandable anchor sleeve system for a wellbore comprising a base casing, comprising:
    an expansion device comprising:
        a shaft;
        an expansion swage slidably attached to the shaft;
        a connecting device couple to the shaft; and
        a thruster; and
    an expandable anchor sleeve comprising:

a front-end;
a back-end;
an anchoring element having a conical shape with a front-end radial thickness and a back-end radial thickness, wherein the front-end radial thickness is larger than the back-end radial thickness; and
a ball seat disposed in the front-end, wherein a frac ball is disposed between the ball seat and the connecting device.

2. The expandable anchor sleeve of claim 1, wherein the anchoring element comprises a C-ring comprising hardened material.

3. An expandable anchor sleeve system, comprising:
an expandable anchor sleeve comprising:
a front-end;
a back-end;
a sealing element disposed at the back-end;
an anchoring element disposed in the expandable anchor sleeve, wherein the anchoring element comprises a conical shape with a front-end radial thickness and a back-end radial thickness wherein the front-end radial thickness is larger than the back-end radial thickness;
a gripping element disposed at the front-end; and
a ball seat disposed in the front-end, wherein a frac ball is disposed between the ball seat and a connecting device; and
an expansion device comprising:
a shaft;
an expansion swage slidably attached to the shaft;
the connecting device coupled to the shaft; and
a thruster.

4. The expandable anchor sleeve of claim 3, wherein the expandable sleeve comprises a threaded portion at the front-end.

5. A method for installation of an expandable anchor sleeve in a well comprising a base casing, comprising:
(a) connecting an expandable anchor sleeve to an expansion device wherein the expandable anchor sleeve comprises:
a front-end;
a back-end;
an anchoring element disposed in the expandable sleeve, wherein the anchoring element comprises a conical shape with a front-end radial thickness being larger than a back-end radial thickness;
a gripping element disposed at the front-end; and
a ball seat positioned in front of the gripping element, wherein a frac ball is positioned between the ball seat and the gripping element; and
the expansion device comprising:
a shaft;
an expansion swage slidably attached to the shaft;
a connecting device coupled to the shaft; and
a thruster;
(b) deploying the expandable anchor sleeve and the expansion device to a desired location in the well;
(c) activating the expansion device, wherein activating the expansion device expands the anchor sleeve into interference contact with the base casing and disengages the expandable anchor sleeve from the expansion device; and
(d) removing the expansion device from the well.

6. The method of claim 5, wherein the expandable anchor sleeve comprises a sealing element disposed at the back-end.

7. The method of claim 5, wherein the expandable anchor sleeve comprises a threaded portion at the front-end.

8. The method of claim 7, wherein the expandable anchor sleeve is coupled to a tubular.

9. The method of claim 8, wherein the tubular is an expandable tubular.

10. The method of claim 5, wherein the expandable anchor sleeve comprises a nipple positioned inside the sleeve.

11. The method of claim 5, further comprising:
(e) fracturing a new perforated zone up-hole of the expandable sleeve;
(f) Repeating steps (a) to (e) for fracturing a plurality of zones.

12. The method of claim 5, wherein the expandable anchor sleeve further comprises a sealing element disposed at the back-end.

* * * * *